(12) United States Patent
Onozuka et al.

(10) Patent No.: US 7,661,912 B2
(45) Date of Patent: Feb. 16, 2010

(54) TOOL HAVING DAMPER

(75) Inventors: Hideaki Onozuka, Sagamihara (JP); Hayato Takahashi, Tokyo (JP); Tomu Katou, Kasumigaura (JP)

(73) Assignee: Hitachi Tool Engineering, Ltd., Tokyo (JP)

( * ) Notice: Subject to any disclaimer, the term of this patent is extended or adjusted under 35 U.S.C. 154(b) by 587 days.

(21) Appl. No.: 11/412,985

(22) Filed: Apr. 28, 2006

(65) Prior Publication Data

US 2006/0275090 A1 Dec. 7, 2006

(30) Foreign Application Priority Data

Apr. 28, 2005 (JP) ............... 2005-130997

(51) Int. Cl.
*B23B 47/00* (2006.01)
(52) U.S. Cl. ............... 408/143; 409/141; 188/322.5; 188/379
(58) Field of Classification Search ............... 408/143; 409/141; 82/163, 903, 904; 267/137; 188/322.5, 188/378, 379; *B23B 47/00*
See application file for complete search history.

(56) References Cited

U.S. PATENT DOCUMENTS

| | | | | | |
|---|---|---|---|---|---|
| 3,642,378 | A | * | 2/1972 | Hahn et al. ............... | 408/143 |
| 3,838,936 | A | * | 10/1974 | Andreassen et al. ......... | 408/143 |
| 3,938,626 | A | * | 2/1976 | Hopkins ............... | 188/378 |
| 4,553,884 | A | * | 11/1985 | Fitzgerald et al. ........... | 408/143 |
| 4,905,776 | A | * | 3/1990 | Beynet et al. ............... | 175/56 |
| 5,413,318 | A | * | 5/1995 | Andreassen ............... | 267/140 |
| 5,518,347 | A | * | 5/1996 | Cobb, Jr. ............... | 409/141 |
| 6,443,673 | B1 | * | 9/2002 | Etling et al. ............... | 408/1 R |
| 6,619,165 | B2 | * | 9/2003 | Perkowski ............... | 82/160 |
| 7,028,997 | B2 | * | 4/2006 | Takahashi et al. ........... | 267/137 |
| 7,284,460 | B2 | * | 10/2007 | Yamamoto ............... | 74/573.1 |
| 7,490,536 | B2 | * | 2/2009 | Murakami et al. ........... | 82/158 |
| 7,591,209 | B2 | * | 9/2009 | Murakami et al. ........... | 82/158 |
| 2008/0124182 | A1 | * | 5/2008 | Ando et al. ............... | 409/231 |

FOREIGN PATENT DOCUMENTS

JP 59-000110 1/1984

(Continued)

*Primary Examiner*—Eric A Gates
(74) *Attorney, Agent, or Firm*—Antonelli, Terry, Stout & Kraus, LLP.

(57) ABSTRACT

Disclosed herein is the structure of a damper that is capable of improving the degree of freedom in design to optimize the damping characteristics of the damper and is capable of allowing the damper to be easily optimized and manufactured for a wide variety of dynamic stiffness characteristics of a tool body, and a manufacturing method using the same. A plurality of ring-shaped elastic members are disposed at opposite ends of a weight part. The weight part is connected to the tool body via the elastic members. Consequently, the weight part is moved relative to the tool body. The plurality of elastic members are mounted while spacers are disposed between the elastic members, and the spacers are moved with respect to the weight part in the axial direction thereof. A viscous fluid is filled in the region surrounded by the outer circumferential surfaces of the spacers, the elastic members, and the inner surface of a hollow part of the tool body. Consequently, it is possible to damp the relative movement of the weight part with respect to the tool body.

9 Claims, 8 Drawing Sheets

FOREIGN PATENT DOCUMENTS

| | | | |
|---|---|---|---|
| JP | 06-031507 | | 2/1994 |
| JP | 06031508 A | * | 2/1994 |
| JP | 06031509 A | * | 2/1994 |
| JP | 2001328022 A | * | 11/2001 |
| JP | 2005-186240 | | 7/2005 |
| JP | 2005-199391 | | 7/2005 |
| WO | WO 92/14947 | | 9/1992 |

* cited by examiner

TOOL HAVING DAMPER

FIELD OF THE INVENTION

The present invention relates to a tool having a damper and a cutting method using the same, and, more particularly, to a long tool attached in a cutting tool or a workpiece for preventing the generation of chatter vibrations when a cutting process is carried out using a machine tool, and a cutting method using the same.

BACKGROUND OF THE INVENTION

During an inner boring process using a lathe, a boring process using a machining center, or a process using an endmill or a milling cutter is performed, a narrow part or a deep hole part is processed using a long tool, the protruding size of which is relatively large as compared to the total size of the tool. At this time a boring bite or a milling cutter is attached to the tip end of the tool. For this reason, the stiffness at a holder of the cutting tool is lowered as the length of the holder is increased. As a result, chatter vibrations are easily generated, the surface roughness or the accuracy in size is deteriorated, and the tool is damaged or broken.

Various methods have been proposed for preventing the generation of the chatter vibrations when a machining process is performed using such a long tool. For example, there has been proposed a method of improving the stiffness of the tool holder by thermally spraying a material having high Young's modulus, such as cemented carbide, to the outer circumferential part of the tool holder. Also, there has been proposed a method of improving the stiffness of the tool holder by fitting a member, such as cemented carbide, in the tool holder or a groove formed at the inside and the outer circumferential part of the tool holder.

On the other hand, there has also been proposed a method of damping the vibration of the tool by the provision of a damper in which a weight part is supported by elastic members and the vibrations of the weight part are damped using a viscous fluid. For example, Japanese Patent Laid-Open No. H06-31507 discloses a method of using a rod-shaped member as a mechanism for elastically supporting the weight part. Furthermore, Japanese Patent Laid-Open No. S59-110 discloses a method of filling a region surrounded by the outer circumferential surface of a cylindrical weight part and the inner surface of a hollow part of a tool body with a viscous fluid. According to the disclosure of Japanese Patent Laid-Open No. S59-110, ring-shaped elastic members and the weight part are disposed in the hollow part of the tool holder, whereby the vibrations of the tool holder are effectively prevented.

Also, Published Japanese Translation of PCT International Publication for Patent Application No. 06-505322 discloses a method of inserting a coolant pipe through the hollow part of a weight part and filling the gap formed between the coolant pipe and the hollow part with a viscous fluid. According to the disclosure of Published Japanese Translation of PCT International Publication for Patent Application No. 06-505322, the pipe is disposed in a through-hole formed adjacent to the central axis of the weight part, which is formed in the shape of a cylinder, and the weight part is connected to the pipe via ring-shaped elastic members. As a result, the weight is elastically supported with respect to the tool body. Furthermore, the region surrounded by the outer circumferential surface of the pipe and the inner surface of the through-hole is filled with a viscous fluid.

Methods of adding a material having high Young's modulus, such as cemented carbide, to the tool body of a tool provided for preventing the generation of chatter vibrations, which has been proposed from the past, are ones that increase the load necessary to change the spring constant of the tip end of the tool, i.e., the unit length of the tip end of the tool. In these methods, it may be required to form, with high accuracy, grooves or holes, in which the material, such as cemented carbide, is added, and therefore, the manufacturing costs may be increased. Also, it is possible to change the natural frequency by improving the spring constant; however, the damping due to the friction at the connection part is not very large, and therefore, desired vibration prevention is not obtained.

In methods of adding the damper, such as the weight part which is elastically supported, to the tool holder, on the other hand, a dynamic damper is constructed by providing a reaction force, which is proportioned to the vibration amplitude of the tool holder, using the weight part having large inertia, whereby the vibrations are damped. In these methods, the tool body is maintained in a natural frequency mode; however, the natural frequency mode is denied by the dynamic damper, and therefore, the vibration amplitude is decreased. In this method, it is possible to obtain relatively high damping ratio, and therefore, it is considered that this method is the most suitable for improving the stability with respect to the chatter vibrations.

In the boring tool or the rotary tool, it is necessary that the tool body be formed in the shape of a cylinder, and the cylindrical hollow part is formed in the tool body such that a weight part, which is formed substantially in the shape of a cylinder, can be mounted in the cylindrical hollow part. The weight part is connected to the tool body via ring-shaped elastic members, and therefore, the weight part is elastically supported. Consequently, the weight part can be moved relative to the tool body. Also, a viscous fluid is filled between the weight part or the tool body and the supporting mechanism, and therefore, the resistance proportioned to the moving velocity of the weight part is obtained when the weight part is moved relative to the tool body. As a result, the vibrations are damped.

According to the disclosure of Japanese Patent Laid-Open No. 59-110, the viscous resistance when the cylindrical object is moved in the cylindrical viscous fluid is increased as the length and the radius of the fluid layer is increased. Also, the viscous resistance is increased as the gap, i.e., the thickness of the fluid layer is decreased.

In the dynamic damper, the optimum value of the viscous resistance with respect to the movement of the weight part exists, and therefore, it is not possible to obtain the function as the damper when the viscous resistance is too large or too small. The spring constant to support the weight part, is the same. Consequently, in the case that normal silicon oil is used as the viscous fluid, there are frequent occasions when the viscous resistance is too large, or there are frequent occasions when the gap must be large. As a result, in the case that the inner diameter of the damper is fixed, the volume of the weight part mounted in the damper is decreased, and therefore, the performance as the damper is lowered. The optimum value of the viscous resistance of the weight part or the spring constant to support the weight part is greatly changed by the vibration characteristics of the tool body, i.e., the spring constant or the natural frequency of the tool body. In the case that the damper is mounted in the tool, however, the optimum value of the viscous resistance of the weight part or the spring constant to support the weight part is also changed as the length of the tool body or the mass of the cutting tool attached to the tip end of the tool body is changed. In this method, a unit for adjusting the spring constant by compressing the elastic members using screws is disclosed. However, it is necessary to change the outer diameter of the weight part in order to adjust the viscous resistance. It is necessary to change the viscosity of oil filled in the damper or to previously prepare a plurality of weight parts having different outer diameters in order to make sure that the damper responds to various states. For this reason, this method is not suitable for multi-product and small-quantity production applications in which multi-purpose tools are manufactured.

According to the disclosure of Published Japanese Translation of PCT International Publication for Patent Application No. 06-505322, on the other hand, it is necessary to change of the viscosity of the viscous fluid in the damper or to change the inner diameter of the through-hole of the weight part in order to adjust the viscous resistance of the weight part. Since the performance as the damper is improved as the mass of the weight part is increased, it is preferable to make the weight part using a material having high specific gravity. However, a material, such as tungsten, is very expensive. As a result, it is not reasonable to manufacture a plurality of weight parts having different inner diameters in the case that the damper is produced on a large scale. Also, even in the case that the exclusive damper is manufactured only once, it is necessary to prepare a plurality of weight parts having different inner diameters or perform further machining in order to adjust the viscous resistance. For this reason, this method is also not suitable for multi-product and small-quantity production applications in which multi-purpose tools are manufactured.

Also, in the case that the tool body, in which the dynamic damper is mounted, is long, and the mass of the tool body is large, like a long tool, the vibrations of the tool body are easily damped when the mass of the weight part mounted in the tool body is also large. However, when the mass of the weight part is large, the natural frequency in the relative movement of the weight part with respect to the tool body is lowered. Consequently, it is necessary to increase the spring constant of the elastic members in response to the mass of the weight part. It is possible to compress the elastic members in order to change the spring constant. However, the amount of change is not very large, and therefore, it is also possible to decrease the sectional area of the ring-shaped elastic members. However, when the sectional area of the elastic members is decreased, the compression margin is also decreased. As a result, it is difficult to adjust the natural frequency of the weight part.

As described above, according to the conventional arts, in the damper having the structure in which the weight part is supported by the elastic members and the vibrations of the weight part are damped by the viscous fluid, it is necessary to easily change the thickness of the viscous fluid layer in order to optimize the viscous resistance with respect to the movement of the weight part. Also, in the case that the tool body, in which the damper is mounted, is a long tool, i.e., it is necessary that the weight part, the mass of which is large, be mounted in the tool body, the sectional area of the elastic members is decreased, and therefore, the increase of the spring constant is also necessary.

SUMMARY OF THE INVENTION

Therefore, the present invention has been made in view of the above problems, and it is an object of the present invention to provide the structure of a damper, which is mounted in a tool, that is capable of improving the degree of freedom in design to optimize the damping characteristics of the damper and can also be suitably used in multi-product and small-quantity production applications, and a manufacturing method using the same.

It is another object of the present invention to provide the structure of a damper that is capable of allowing the damper to be easily optimized and manufactured for a wide variety of dynamic stiffness characteristics of a tool body, and a manufacturing method using the same.

In accordance with the present invention, one of solutions is the following composition.

A tool comprising: a damper constructed by a hollow part extending in the axial direction in a tool body and a weight part mounted in the hollow part such that the weight part can be moved relative to the tool body, the weight part being formed substantially in the shape of a cylinder, wherein the weight part is provided at opposite ends thereof, which are opposite to each other in the axial direction, with hermetically-sealed annular spaces, the annular spaces being filled with a viscous fluid.

According to the present invention, hermetically-sealed annular spaces are formed as a part of the damper, and a viscous fluid is filled in the annular spaces. As a result, it is possible to accurately adjust the damping characteristics of the relative movement of the weight part with respect to the tool body by changing the thickness of the viscous fluid layer. Consequently, the degree of freedom in designing the damper is improved for various tools having different sizes and shapes. Also, it is possible to optimize and manufacture the damper for specific dynamic stiffness characteristics of the tool body. Consequently, even when the stiffness of the spindle of a machine tool is different, it is possible to easily design and manufacture an appropriate damper, and therefore, it is possible to easily prevent the generation of chatter vibrations. Furthermore, the present invention can be easily applied to multi-product and small-quantity production applications.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

First, a tool, having a damper mounted therein, according to preferred embodiments of the present invention will be described in brief.

According to the preferred embodiments of the present invention, there is provided a tool having a damper wherein a hollow part is formed in a tool body such that the hollow part extends in the axial direction, and a weight part, which is substantially formed in the shape of a cylinder, is mounted in the hollow part such that the weight part can be moved relative to the tool body. At opposite ends of the weight part, which are opposite to each other in the axial direction, are formed annular spaces, which are hermetically sealed. The annular spaces are filled with a viscous fluid. More specifically, a plurality of ring-shaped elastic members are mounted in the annular spaces, and the viscous fluid is filled in the region surrounded by the outer circumferential surface of the weight part, the inner surface of the tool body, and the plurality of elastic members. Also, spacers are mounted between the plurality of elastic members, in the axial direction of the weight part, such that the spacers can be moved relative to the tool body. In the damper according to the preferred embodiments of the present invention, the load of the weight part can be supported by the plurality of elastic members, even though the ring-shaped elastic members have a low spring constant, and therefore, it is possible to obtain a required spring constant. As a result, it is possible to set the spring constant to a high level, even though the ring-shaped elastic members have a large sectional area. Furthermore, the adjustment margin of the spring constant due to compression is also increased. Also, although the thickness of the viscous fluid layer may be changed by the outer diameter of the spacers, the viscous resistance to the movement of the weight part can be adjusted only by the provision of spacers having different outer diameters, unlike the conventional method, and therefore, the manufacturing costs of the damper are reduced.

Now, a preferred embodiment of the present invention will be described in detail with reference to the accompanying drawings.

Figure 1:
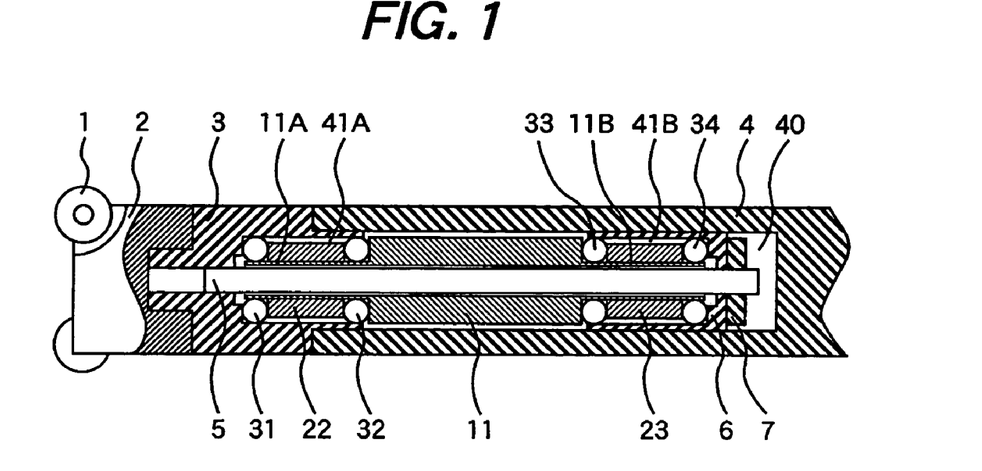
FIG. 1 is a view illustrating a long tool, having a damper mounted therein, according to a preferred embodiment of the present invention.

FIG. 1 is a view illustrating a long tool, having a damper mounted therein, according to a preferred embodiment of the present invention. As shown in FIG. 1, a cutter 2, which has a chip 1 attached thereto, is attached to a cap 3, which is made of steel. The cap 3 is attached to the tip end of a tool body 4, which is made of steel. A hollow part 40, which extends in the axial direction of the tool body 4, is formed in the cap 3 and the tool body 4. In the hollow part 40 is disposed a weight part 11, which is held by a rod 5. Opposite ends of the rod 5 are threaded, and therefore, one end of the rod 5 is threadedly engaged into the cap 3, and the other end of the rod 5 is threadedly engaged into a nut 7 through a stopper 6.

A pair of ring-shaped elastic members 31 and 32 are attached to one end of the weight part 11, and a pair of ring-shaped elastic members 33 and 34 are attached to the other end of the weight part 11. The elastic members 31 and 32 are mounted in the cap 3 and the tool body 4 such that the elastic members 31 and 32 are spaced apart from each other by a spacer 22, which is made of the same material as the tool body 4. Similarly, the elastic members 33 and 34 are mounted in the stopper 6 such that the elastic members 33 and 34 are spaced apart from each other by a spacer 23.

Specifically, the pair of ring-shaped elastic members 31 and 32 are mounted in an annular gap formed between the inner surface of the cap 3 and the outer circumferential surface of a left small-diameter section 11A of the weight part 11, in the hollow part 40 of the cap 3 and the tool body 4, and also, at the outside of the rod 5, while the spacer 22 is disposed between the ring-shaped elastic members 31 and 32. Also, the pair of ring-shaped elastic members 33 and 34 are mounted in an annular gap formed between the inner surface of the stopper 6 and the outer circumferential surface of a right small-diameter section 11B of the weight part 11, at the inside of the stopper 6 in the hollow part 40 of the tool body 4, and also, at the outside of the rod 5, while the spacer 23 is disposed between the ring-shaped elastic members 33 and 34. The elastic members 31 to 34 are pushed by the spacer 23 such that the inside ends and the outside ends, or the right and left ends of the elastic members 31 to 34 are in contact with the surfaces of the cap 3 and the weight part 11 even in the initial state in which the nut 7 is retreated to its rearmost position. As a result, hermetically sealed annular spaces 41A and 41B are formed at the opposite ends of the weight part 11. The hollow part 40 of the cap 3 and the tool body 4 is formed in the shape of a cylinder. The hollow part 40 of the cap 3 and the tool body 4 may be substantially (substantially) formed in the shape of a cylinder. The weight part 11 is formed in the shape of a cylinder. The weight part 11 may be substantially (substantially) formed in the shape of a cylinder.

Figure 2:
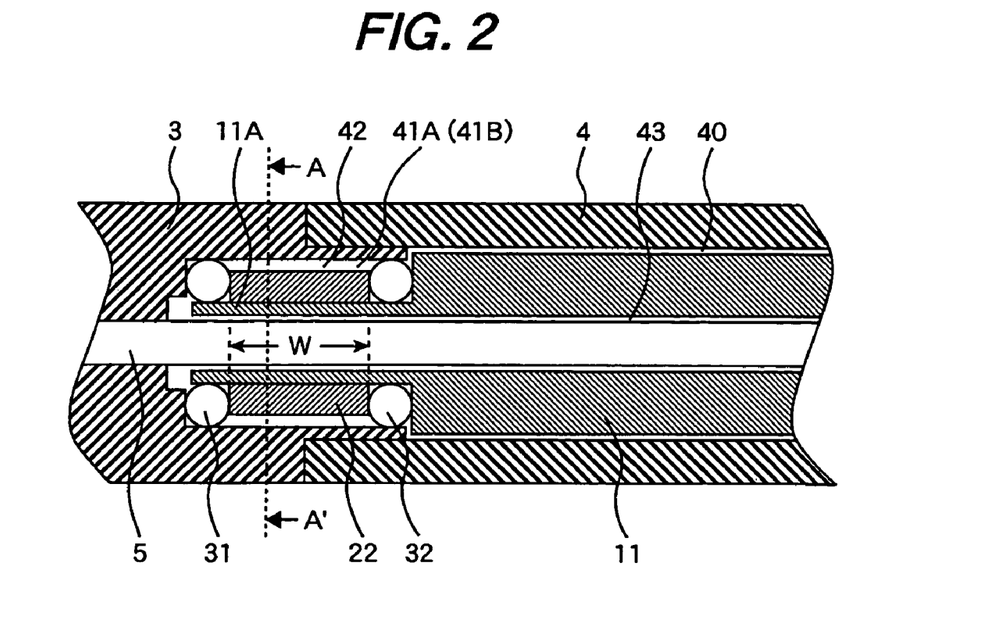
FIG. 2 is an enlarged view illustrating principal components of the tool shown in FIG. 1.

FIG. 2 is a detailed view illustrating the structure of one end of the weight part 11. The annular space 41A is the region surrounded by the inner surface of the hollow part of the cap 3, the outer circumferential surface of the spacer 22, and the elastic members 31 and 32. The annular space 41A is filled with a viscous fluid 42. The viscous fluid 42 can be freely moved in the annular space 41A. The viscous fluid 42 is, for example, silicon oil. The annular space 41B, which is formed inside the stopper 6, has the same structure as the annular space 41A.

Also, air having atmospheric pressure, which was introduced into the tool body 4 when the tool body 4 was exchanged, is present in the space defined at the outer circumference side of the weight part 11 in the hollow part of the tool body 4, in the space defined at the right side of the nut 7 in the hollow part of the tool body 4, and in the space defined between the inside of the hollow part of the weight part 11 and the rod 5 (which are referred to as space 40 as a whole).

The elastic members 31 and 32 are spaced apart from each other by the spacer 22. Similarly, the elastic members 33 and 34 are spaced apart from each other by the spacer 23. The weight part 11 and the stopper 6 can be freely moved with respect to the rod 5 in the axial direction of the rod 5. Also, the spacers 22 and 23 and the elastic members 31 to 34 can be freely moved with respect to the left and right small-diameter sections of the weight part 11 in the axial direction of the weight part 11. Consequently, when the nut 7 is tightened, the elastic members 31 to 34 are uniformly compressed, and the stopper 6 is moved toward the cap 3 side, i.e., toward the tip end side of the tool. At this time, since the spacers 22 and 23, which have stiffness, can be moved in the axial direction of the weight part 11, all the elastic members 31 to 34 are uniformly compressed when the nut 7 is tightened. In other words, the same tension is applied to the plurality of elastic members, and therefore, it is possible to uniformly reduce the width W of the respective annular spaces 41A and 41B using only one nut. When the nut 7 is loosened, on the other hand, all the elastic members 31 to 34 are uniformly expanded.

The weight part 11 and the spacers 22 and 23 are held by the rod 5 such that the weight part 11 and the spacers 22 and 23 can be simultaneously moved relative to the tool body 4 (in the axial direction and the radial direction). In the case of a dynamic damper, the damping efficiency is increased in proportion to an increase in the mass of the weight part. For this reason, the spacers 22 and 23 are made of the same high-density material as the weight part, for example, a tungsten alloy.

According to this embodiment, the spacers are moved with respect to the weight part, and therefore, the tension is uniformly applied to all the elastic members. Furthermore, the thickness of the viscous fluid layer is changed by changing the outer diameter of the spacers. Consequently, the damping characteristics of the weight part can be adjusted, and the degree of freedom, in which the optimum damper is designed based on the vibration characteristics of the tool body, is increased, and the adjustment at the time of manufacturing process can be easily accomplished, which will be described below in more detail.

Figure 3:
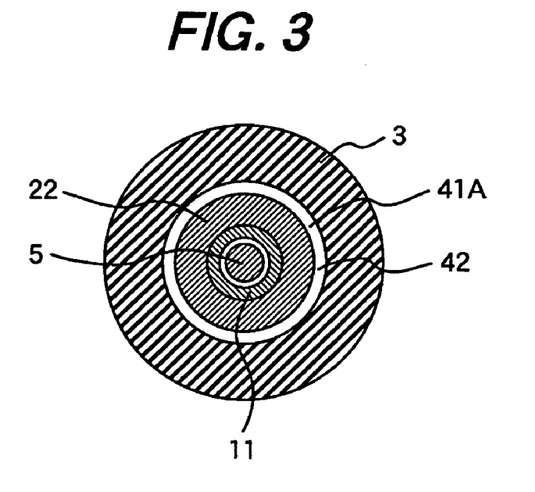
FIG. 3 is a sectional view taken along line A-A' of FIG. 2.
Figure 4:
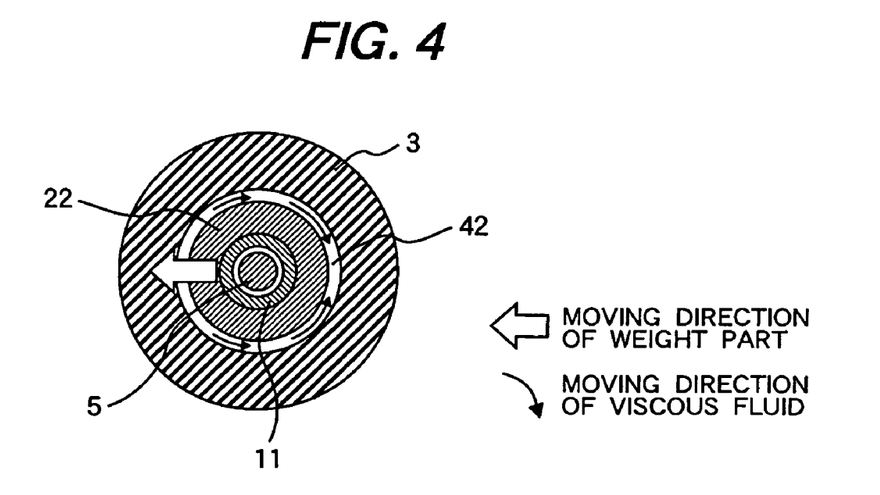
FIG. 4 is a view illustrating the operation of a viscous fluid in the tool according to the preferred embodiment of the present invention.

FIGS. 3 and 4 are sectional views taken along line A-A' of FIG. 2. The annular space 41A defined between the spacer 22 and the cap 3 is filled with the viscous fluid 42. As shown in FIG. 2, the weight part 11 is supported such that the weight part 11 can be moved relative to the tool body 4 while the elastic members 31, 32, 33, and 34 are disposed between the weight part 11 and the tool body 4. Consequently, when the weight part 11 and the spacer 22 is moved relative to the cap 3 in the axial direction, as shown in FIG. 4, the viscous fluid 42 is moved in the opposite direction. At this time, the spacer 22 receives a circumferential-direction resistance force, which is proportioned to the moving speed of the spacer 22, from the viscous fluid 42. As a result, the relative movement between the spacer 22 and the cap 3 is damped, and therefore, the tool body is effectively prevented from vibrating.

The relation between the viscous resistance force F and the moving speed V of the weight 11 and the spacer 22 is expressed by the following equation:

$$F=cV \qquad (1)$$

Where, c indicates coefficient of viscosity.

In the dynamic damper, the coefficient of viscosity c, in which the damping characteristics of the tool body are optimum, exists in response to mass ratios and natural frequencies of the tool body and the weight part. This coefficient of viscosity c is decided based on the viscosity of the viscous fluid, the size of the gap between the spacer 22 and the cap 3, and distance between the elastic members 31 and 32. However, it is difficult to design the optimum coefficient of viscosity c with high precision, and therefore, it is necessary to adjust the coefficient of viscosity c by normally changing the viscosity of the viscous fluid or the size of the gap between the spacer and the cap.

In the conventional art, further machining of the weight part or the tool body was required in order to change the size of the gap between the spacer and the cap. As described above, however, the further machining of the tool body is difficult in the case of the long tool. Also, the weight part was made of heavy metal, and therefore, the material costs were high. In addition, it was difficult to accomplish accurate adjustment by changing the size of the gap between the spacer and the cap.

According to the present invention, the spacers, which are components different from the weight part, are fitted between the plurality of ring-shaped elastic members, and the outer diameters of the spacers are selected, whereby the thickness of the viscous fluid layer is changed. Consequently, for example, a plurality of various spacers 22 having different outer diameters and different lengths (the inner diameters of the spacers 22 are the same) are previously prepared, and the size of the gap between the spacer 22 and the cap 3 is changed by the combination of the spacers having different outer diameters and different lengths. As a result, it is possible to adjust the vibration damping characteristics of the weight part. For this reason, it is possible to adjust the damping characteristics of the damper without further machining. Also, a plurality of elastic members 31 to 34 having different outer diameters and different materials are previously prepared, and it is possible to make proper use of the elastic members 31 to 34 in response to the relation in size between the elastic members 31 to 34 and the spacer 22, and the required characteristics of the elastic members 31 to 34. For example, the respective ring-shaped elastic members may be formed in the sectional shape of an oval instead of a circle.

Also, in the preferred embodiment shown in FIG. 1, the weight part 11 is supported in the tool body 4 while pairs of elastic members are disposed at the right and left sides of the weight part 11, respectively. However, the present invention is not limited to the above construction. It is possible to form pluralities of annular spaces at the right and left sides of the weight part 11, respectively, and to fill the respective annular spaces with viscous fluids having the same characteristics or different characteristics in response to various characteristics. For example, it is possible to dispose two spacers and three elastic members at the right and left sides of the weight part 11, respectively, to form two neighboring annular spaces, whereby a total of 4 annular spaces are used to adjust the coefficient of viscosity c to a desired level. In this case, it is possible to obtain the desired characteristics by provision of combinations of the diameters of the respective spacers, the sizes of the elastic members, and the viscosity of the viscous fluids in the annular spaces, which are the same or different.

When designing a tool having a dynamic damper mounted therein, the mass of the weight part and the coefficient of viscosity are roughly designed in response to the spring constant of the tool body and the mode mass. In the conventional art, the length of the region where the viscous fluid is filled was approximately equal to the length of the weight part, and therefore, only the thickness of the viscous fluid layer was used as a design parameter in the rough design of the coefficient of viscosity.

According to the present invention, the length of the layer of the viscous fluid 42 is decided based on the positional relation between the plurality of elastic members, which are paired. Since it is possible to arbitrarily design the thickness and the length of the viscous fluid layer, it is easy to set the coefficient of viscosity c with high accuracy, and it is possible to respond to wide requirements, and it is possible to improve the degree of freedom in designing the damper and the long tool.

Figure 5:
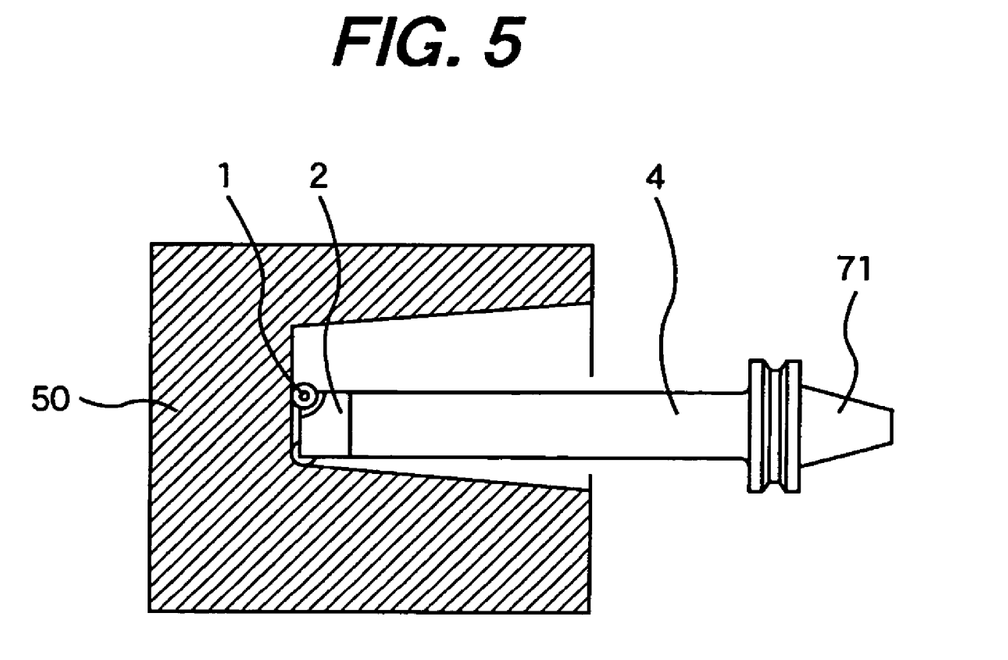
FIG. 5 is a view illustrating a deep carving operation of the tool according to the preferred embodiment of the present invention.

FIG. 5 is a view illustrating a workpiece 50 being cut by the cutter 2 and the chip 1, which are attached to the tip end of the tool body 4 of the long tool having the damper mounted therein according to the present invention. To the other end of the long tool is mounted a taper 71, which is attached to a spindle of a machine tool. In this state, the protruding length of the tool is large, and as a result, the spring constant at the tip end of the tool 2 is significantly decreased.

Figure 6A:
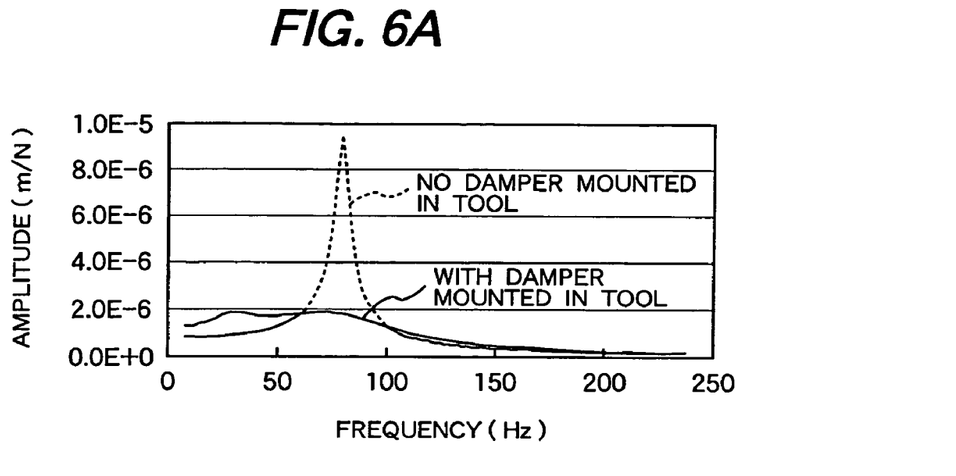
FIG. 6A is a view illustrating the difference in frequency response at the tip end of the tool between the case that the tool has no damper mounted therein and the case that the tool has a damper mounted therein according to the preferred embodiment of the present invention.

FIG. 6A is a view illustrating the difference in frequency response at the tip end of the tool between the case that the tool has no damper mounted therein and the case that the tool has a damper mounted therein according to the preferred embodiment of the present invention. As can be seen from FIG. 6A, in the tool having the damper mounted therein according to the present invention, the vibration amplitude of the natural frequency is damped. As a result, the vibrations due to the cutting force applied to the long tool are damped, and therefore, it is possible to prevent the generation of chatter vibrations.

Figure 6B:
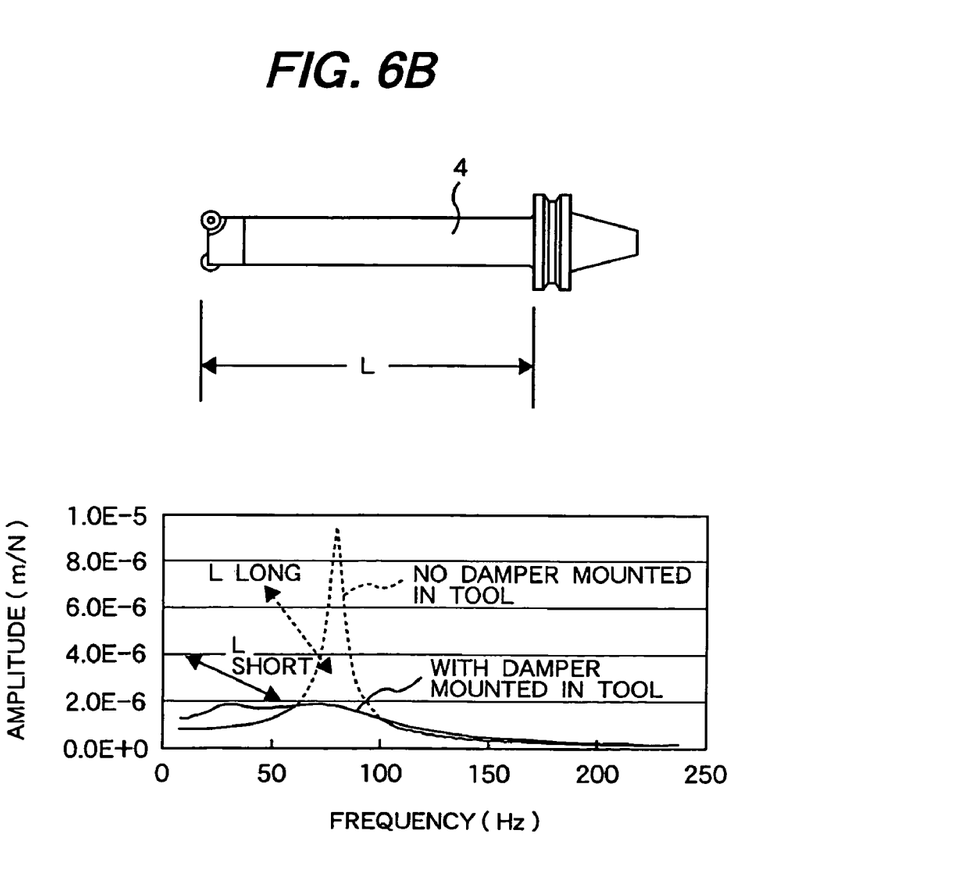
FIG. 6B is a view illustrating the relation between the length of the tool body and the vibration characteristics of the long tool.

Also, in the case that the length of the tool body 4 is referred to as L, the characteristics of the frequency response at the tip end of the tool are moved to the left and upper side of the drawing as the length L is increased as shown in FIG. 6B. Specifically, according to the characteristics of the frequency response at the tip end of the tool, the maximum amplitude is increased as the length L of the tool body 4 is increased. In the case that the tool has no damper mounted therein, on the other hand, the degree in change of the amplitude is very great as compared to the case that the tool has the damper mounted therein. Consequently, according to the present invention, the vibration amplitude of the natural frequency is damped, even when the length of the long tool is very large, and therefore, the vibrations due to the cutting force applied to the long tool are damped.

Also, according to the present invention, it is possible to design long tools having different lengths and diameters with high degree of freedom, and furthermore, to accurately and optimally adjust the damping characteristics of the damper in response to the lengths and the diameters.

According to the characteristics of the present invention as described above, for example, it is possible to cut an impeller or a guide vane using the long tool. Hereinafter, the cutting process of the impeller or the guide vane using the long tool will be described.

In the conventional art, the impeller or the guide vane, which converts the rotary movement into the axial-directional movement of the fluid, was manufactured by casting or welding the vane to the shaft, in order to reduce the material costs. In order to improve the performance of a pump, for example, it is necessary to increase the accuracy in the shape of the vane. However, it is difficult to improve the accuracy in the shape of the vane using the conventional casting or welding. Furthermore, a great force is applied to the root part of the vane, and therefore, it is required to manufacture the impeller by cutting a single bulk material in order to improve the performance. However, in the case that the impeller is manufactured by cutting the single bulk material, the machining time is increased, the material costs are increased, and therefore, the manufacturing costs are increased. Furthermore, it is necessary to use the long tool in order to cut all the flow channel of the fluid. However, since the tool is damaged or the roughness of the surface of the tool is deteriorated due to the generation of the chatter vibrations, it is not possible to improve the machining efficiency, and therefore, it is very difficult to manufacture the impeller or the guide vane by cutting the single bulk material.

According to the present invention, various tools having different lengths and diameters are previously prepared, and the tools are properly used in response to the manufacturing process of the impeller, whereby it is possible to manufacture the impeller or the guide vane with high accuracy in the shape thereof.

Figure 7A:
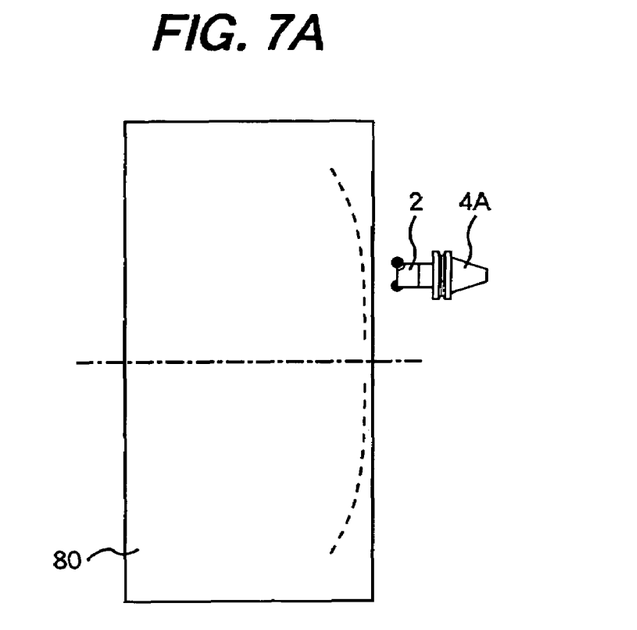
FIG. 7A is a view illustrating a manufacturing process of an impeller according to a preferred embodiment of the present invention.
Figure 7B:
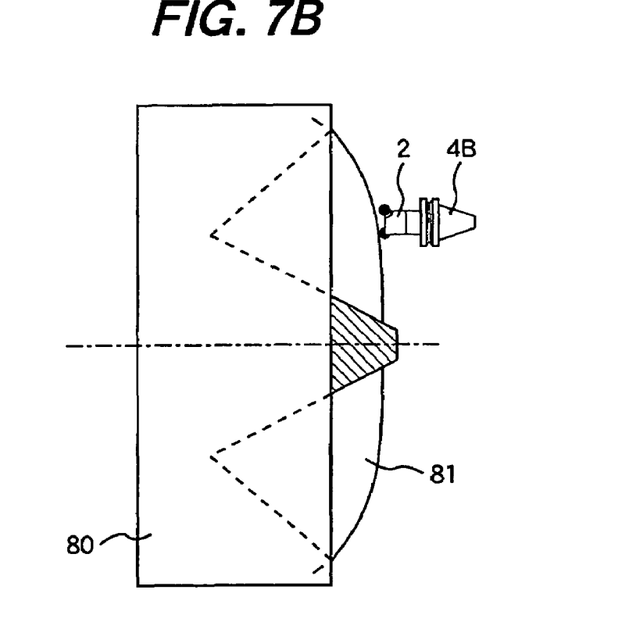
FIG. 7B is a view illustrating a manufacturing process of an impeller according to a preferred embodiment of the present invention.
Figure 7C:
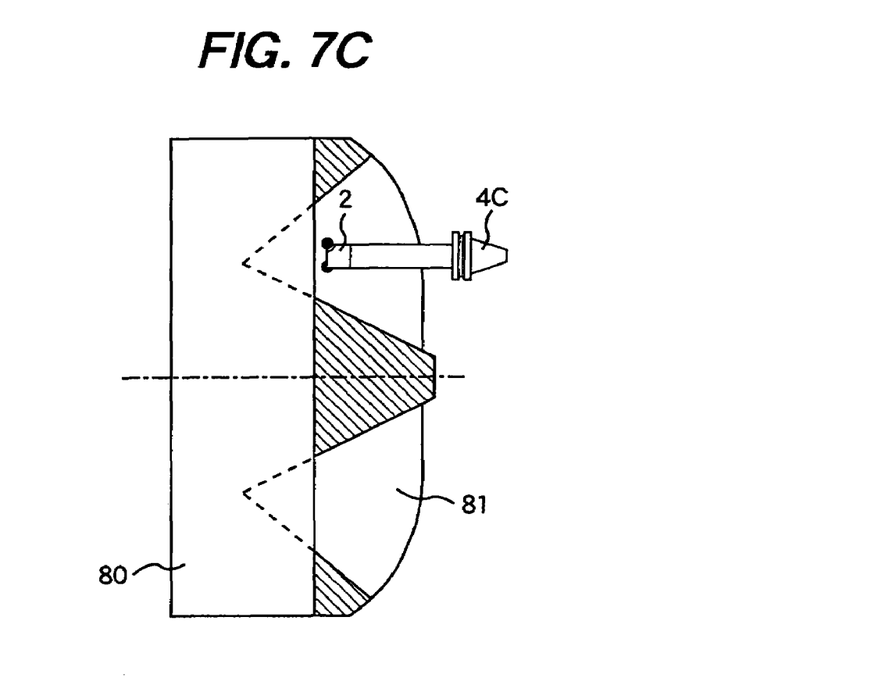
FIG. 7C is a view illustrating a manufacturing process of an impeller according to a preferred embodiment of the present invention.
Figure 7D:
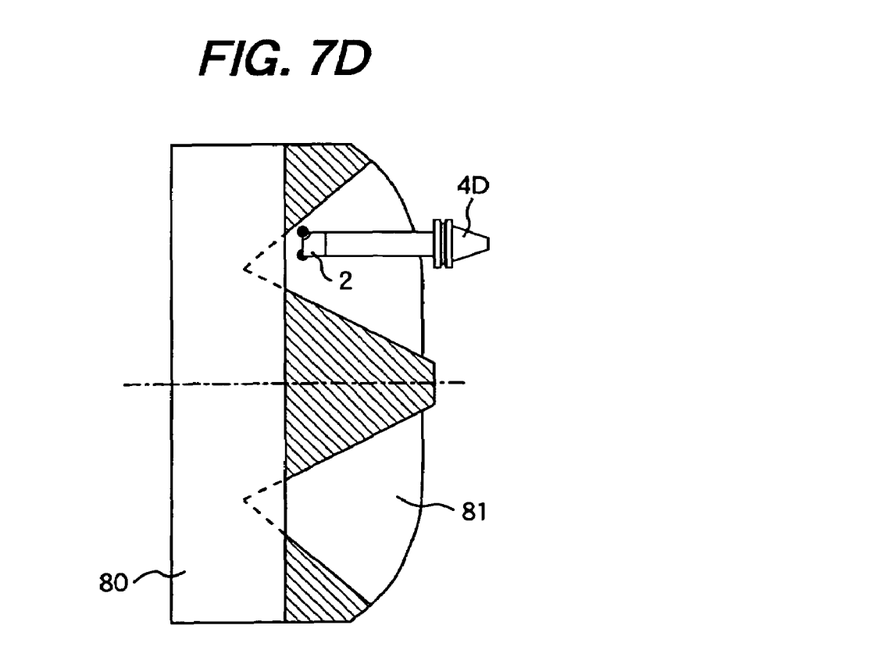
FIG. 7D is a view illustrating a manufacturing process of an impeller according to a preferred embodiment of the present invention.
Figure 7E:
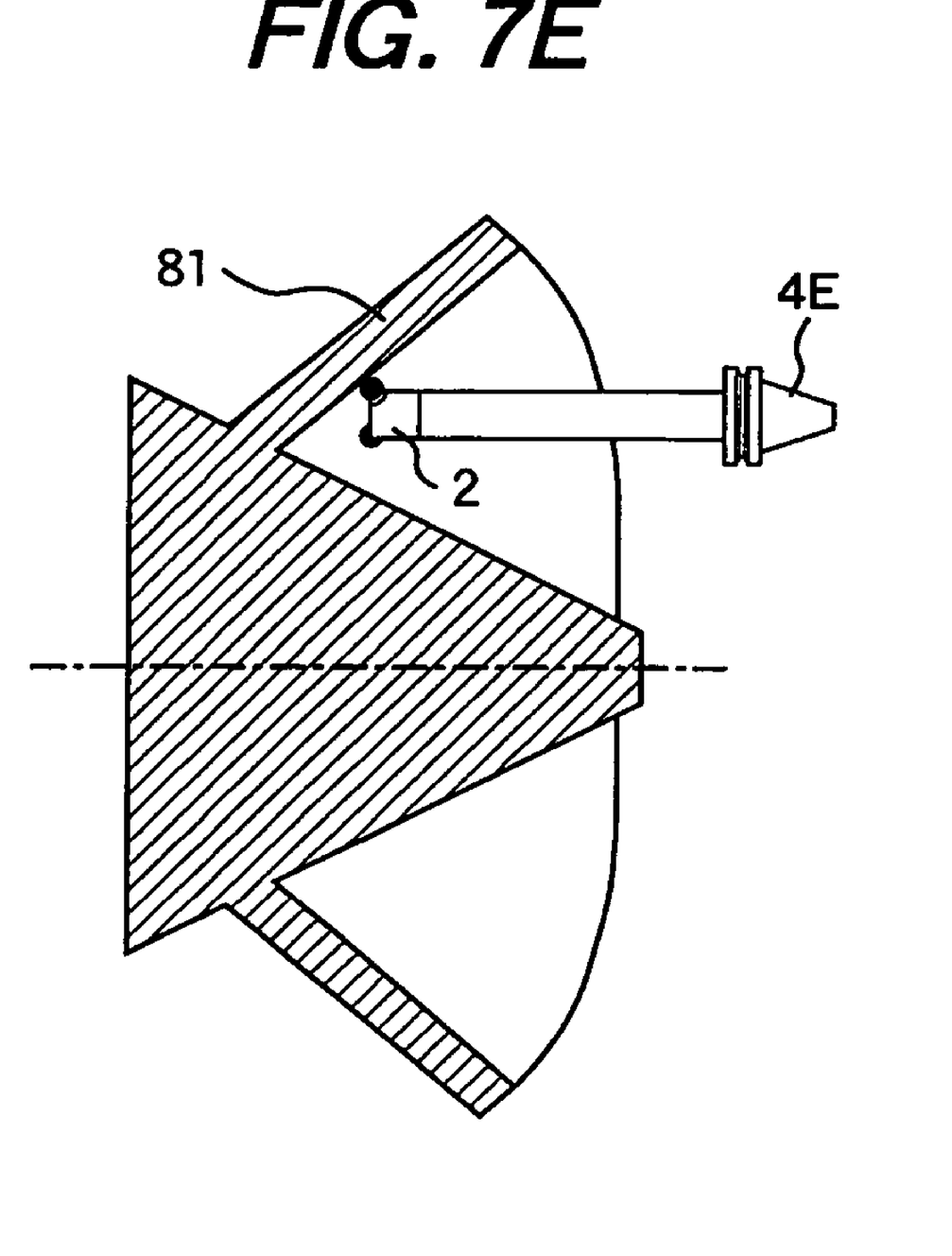
FIG. 7E is a view illustrating a manufacturing process of an impeller according to a preferred embodiment of the present invention.

FIGS. 7A to 7E are views illustrating a manufacturing process of the impeller according to a preferred embodiment of the present invention. In the first step, as shown in FIG. 7A, the right end surface of a columnar bulk material 80 is cut, by a cutter 2 attached to the tip end of a tool body 4A of a short tool having no damper mounted therein, to form a boss part of the vane. At this time, the cutting process is carried out while a cutting fluid is supplied to the part being processed such that the cut pieces flow out. Subsequently, as shown in FIG. 7B, the inner surfaces of the boss part and the guide vane of the vane 81 are cut in the shape of a spiral along the flow channel of the fluid by the cutter 2 attached to the tip end of the short tool, the length of which is small and which has no damper mounted therein. After that, as shown in FIG. 7C, the inner surfaces of the boss part and the guide vane of the vane 81 are cut in the shape of a spiral along the flow channel of the fluid by a cutter 2 attached to the tip end of a tool body 4C of a long tool having a damper mounted therein according to the present invention. In the same manner, as shown in FIGS. 7D and 7E, the tool body 4C of the long tool is replaced with a tool body 4D or a tool body 4E, which is longer than the tool body 4C, and the bottoms of the inner surfaces of the boss part and the guide vane are cut by the replaced tool body 4D or 4E. Also, the outer surfaces of the boss part and the guide vane are separately cut using another tool. In this way, as shown in FIG. 7E, the impeller is manufactured by cutting the bulk material 80.

Generally, in the case that the radius of the bulk material 80 shown in FIG. 7A, which is made of stainless steel, is 500 mm to 900 mm, and the processed depth to the bottoms of the inner surfaces of the boss part and the guide vane is 300 mm to 900 mm, short tools, the lengths L of which are 300 mm, 400 mm, and 500 mm, are prepared (in units of 100 mm), and long tools having a damper mounted therein according to the present invention, the lengths L of which are 600 mm, 700 mm, 800 mm, and 900 mm, are prepared (in units of 100 mm). These tools are properly used in response to the progress state of the manufacturing process, whereby it is possible to manufacture the impeller or the guide vane with high accuracy in the shape thereof. At this time, it is preferable to use a cutter having a diameter (an outer diameter of the tool body) of 32 mm to 100 mm as the cutter 2.

Furthermore, it is preferable to sort the short tool and the long tool from each other such that the short tool and the long tool can be properly used. For example, it is preferable that the tool having a length L of approximately 300 mm to 500 mm be used as the short tool and the tool having a length L of approximately 600 mm to 900 mm be used as the long tool.

According to the present invention, various tools having different lengths can be properly used in response to the manufacturing process of the impeller, and the damping characteristics of the damper can be accurately and optimally adjusted in response to the lengths and the diameters of the used tools. Consequently, the manufacturing process of the impeller or the guide vane by cutting the single bulk material is carried out with high efficiency.

Figure 8:
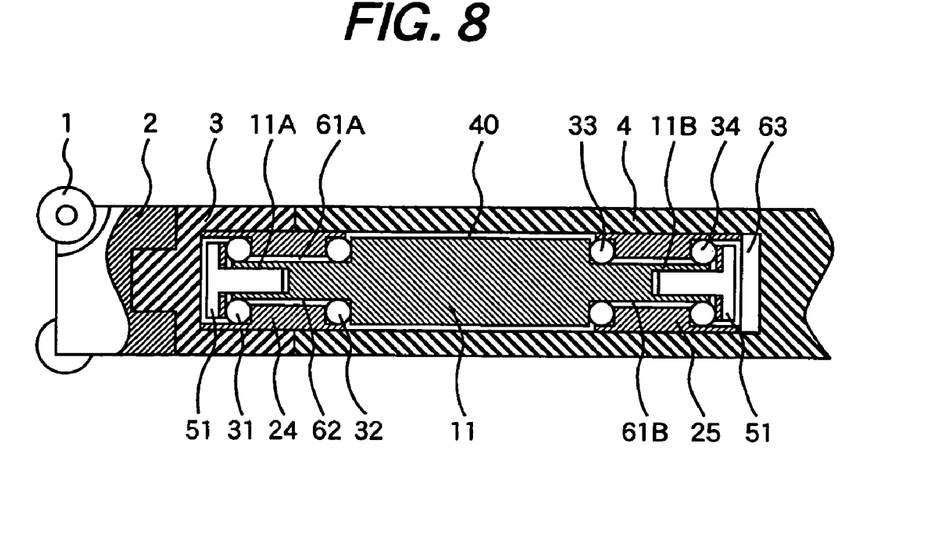
FIG. 8 is a view illustrating a long tool, having a damper mounted therein, according to another preferred embodiment of the present invention.

FIG. 8 is a view illustrating a long tool, having a damper mounted therein, according to another preferred embodiment of the present invention. A spacer 24 is mounted at the side of a cap 3 and a tool body 4. Threaded holes are formed at opposite ends of a weight part 11, and bolts 51 are threadedly engaged in the threaded holes. In this embodiment, a pair of ring-shaped elastic members 31 and 32 are mounted in an annular gap formed between the inner surfaces of the cap 3 and the tool body 4 and the outer circumferential surface of a left small-diameter section 11A of the weight part 11, in the hollow part 40 of the cap 3 and the tool body 4, while the spacer 24 is disposed between the ring-shaped elastic members 31 and 32. Also, a pair of ring-shaped elastic members 33 and 34 are mounted in an annular gap formed between the inner surface of a stopper 63 and the outer circumferential surface of a right small-diameter section 11B of the weight part 11, at the inside of the stopper 60 in the hollow part of the tool body 4, while a spacer 25 is disposed between the ring-shaped elastic members 33 and 34. The spacers 24 and 25 are made of the same material as the tool body 4. As a result, hermetically sealed annular spaces 61A and 61B are formed inside the spacers 24 and 25, respectively. The annular spaces 61A and 61B are filled with a viscous fluid 62, such as silicon oil.

In this embodiment, when the bolts 51 are tightened, the elastic members 31 to 34, which are paired, are uniformly deformed, i.e., the annular spaces 61A and 61B are uniformly deformed. As a result, the spring constant is changed, and therefore, it is possible to adjust the coefficient of viscosity c.

In other words, it is possible to roughly design the damping characteristics according to the thickness and the length of the layer of the viscous fluid 62 in the respective annular spaces 61A and 61B, in the same manner as the structure shown in FIG. 1. Furthermore, since the spacer 22 is made of the same material as the tool body, it is possible to manufacture spacers having different inner diameters at low costs, and therefore, it is possible to accurately adjust the damping characteristics.

Figure 9:
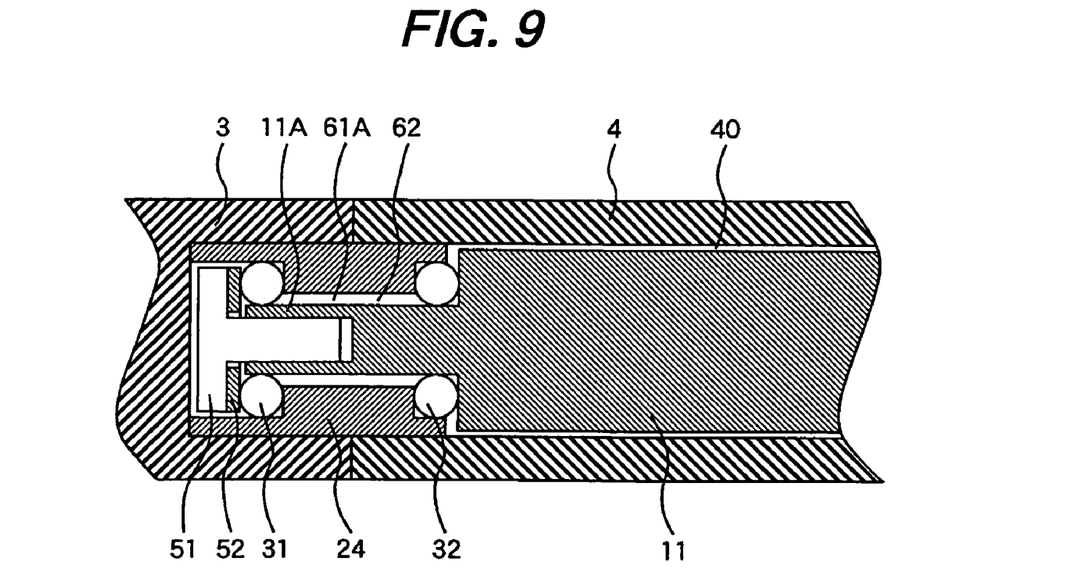
FIG. 9 is an enlarged view illustrating principal components of the tool shown in FIG. 8.

FIG. 9 is an enlarged view illustrating principal components of the tool shown in FIG. 8. Since the bolt 51 is rotated, and therefore, the bolt 51 is threadedly engaged into the weight part 11, a washer 52 is disposed between the elastic member 31 and the contact surface of the bolt 51. In this embodiment, spacer can be moved with respect to the weight part, and therefore, the tension applied to all the elastic members is uniform. Furthermore, since the thickness of the viscous fluid layer is changed by changing the inner diameter of the spacer, it is possible to adjust the damping characteristics of the weight part. Consequently, the degree of freedom, in which the optimum damper is designed based on the vibration characteristics of the tool body, is increased, and the adjustment at the time of manufacturing process can be easily accomplished.

As apparent from the above description, according to the present invention, the pairs of ring-shaped elastic members are mounted at the opposite ends of the weight part, respectively, and the thickness of the viscous fluid layer is changed by changing the outer diameters or the inner diameters of the spacers disposed between the ring-shaped elastic members. As a result, it is possible to adjust the damping characteristics of the relative movement of the weight part with respect to the tool body. Consequently, even when the stiffness of the spindle of the machine tool is different, it is possible to easily design and manufacture an appropriate damper, and therefore, it is possible to easily prevent the generation of chatter vibrations.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tool having a damper, comprising:
    a tool body, including a hollow part extending in an axial direction in the tool body;
    a pair of ring-shaped elastic members;
    a substantially cylindrical weight part mounted in the hollow part, such that the weight part is held by a rod, and the weight part can be moved relative to the tool body through the pair of ring-shaped elastic members;
    a ring-shaped spacer having a stiffness, that is disposed between the ring-shaped elastic members at an outside end of the weight part, that contacts said ring-shaped elastic members at opposite ends of the ring-shaped spacer, and wherein the outside of the ring-shaped spacer defines an inner surface of the hollow part of the tool body;
    a unit held by the rod, for moving the ring-shaped spacer in the axial direction; and
    an hermetically-sealed annular space that is filled with a viscous fluid, provided at an end of the weight part in the axial direction, and axial ends of the annular space being defined by the pair of ring shaped elastic members.

2. The tool having the damper according to claim 1, wherein the tool body is constituted capable of changing a damping characteristics by changing a thickness of the layer of viscous fluid or a viscosity of the viscous fluid.

3. The tool having the damper according claim 1, further comprising
    an additional pair of ring-shaped elastic members;
    an additional ring-shaped spacer having a stiffness, that is disposed between the additional pair of ring-shaped elastic members at the outside of the weight part, that contacts said ring-shaped elastic members at opposite ends of the ring-shaped spacer, and wherein the outside of the ring-shaped spacer comprises an inner surface of the hollow part of the tool body, and wherein the ring-shaped spacers are disposed at opposite ends of the weight part in the axial direction;
    an additional hermetically-sealed annular space that is filled with a viscous fluid, such that the hermetically-sealed annular spaces are provided at opposite end of the weight part in the axial directions, and such that the additional hermetically-sealed annular space is in contact with the additional ring-shaped spacer and the additional pair of ring-shaped elastic members disposed at opposite ends of the hermetically-sealed annular space.

4. A tool having a damper, comprising:
    a tool body, with a hollow part extending in an axial direction in the tool body;
    a pair of ring-shaped elastic members;
    a weight part that is substantially cylindrical, comprises a small-diameter section at an end thereof in the axial direction, and is mounted in the hollow part such that the weight part can be moved relative to the tool body through the pair of ring-shaped elastic members;
    an hermetically-sealed annular space filled with a viscous fluid, in contact with the small-diameter section at an end of the weight part in the axial direction, and axial ends of the annular space being defined by the pair of ring shaped elastic members;
    a ring-shaped spacer having a stiffness, disposed between and in contact with the ring-shaped elastic members disposed at opposite ends of the ring-shaped spacer and at the inner side of the hollow part, and wherein the ring-shaped spacer is separated by the viscous fluid from an outer surface of a small-diameter section of the weight part; and
    a unit for moving the ring-shaped spacer in the axial direction, said unit being held by the small-diameter sections of the weight part.

5. The tool having the damper according to claim 4, further comprising
an additional pair of ring-shaped elastic members;
an additional small-diameter section at another end of the weight part in the axial direction;
an additional hermetically-sealed annular space filled with the viscous fluid, in contact with the additional pair of ring-shaped elastic members, and in contact with the additional small-diameter section at another end of the weight part in the axial direction;
an additional ring-shaped spacer having a stiffness, disposed between and in contact with the additional pair of ring-shaped elastic members disposed at opposite ends of the additional ring-shaped spacer and at the inner side of the hollow part, and wherein the additional ring-shaped spacer is separated by the viscous fluid from an outer surface of the additional small-diameter section of the weight part.

6. The tool having the damper according to claim 4, wherein
the tool body is configured to change a damping characteristic by changing a thickness of the layer of viscous fluid.

7. The tool having the damper according to claim 4, wherein the tool body is constituted capable of changing a damping characteristic by changing a thickness of the layer of viscous fluid or a viscosity of the viscous fluid.

8. A tool having a damper, comprising:
a tool body, including a hollow part extending in an axial direction in the tool body;
ring-shaped elastic members mounted in the hollow part of the tool body;
a weight part that is substantially cylindrical, and mounted in the hollow part and in the ring-shaped elastic members;
a rod mounted in an axial direction of the weight part, such that the weight part is held by the rod, and the weight part can be moved relative to the tool body through pairs of ring-shaped elastic members;
a ring-shaped spacer having a stiffness, disposed between a pair of the ring-shaped elastic members, and disposed either (1) on the outer surface of an end of the weight part, or (2) in contact with at least one of the tool body and a cap in proximity to an end of the weight part; and
a unit held by the rod, for moving the ring-shaped spacer in the axial direction; and
a hermetically-sealed annular space that is filled with a viscous fluid, disposed at an end of the weight part in the axial direction, axial ends of the annular space being defined by the pair of ring shaped elastic members, and other surfaces of the annular space defined by the ring-shaped spacer, and at least one of (1) the weight part, (2) the cap, and (3) a stopper.

9. The tool having the damper according to claim 8, wherein
the tool body is configured to change a damping characteristic by changing a thickness of the layer of viscous fluid.

* * * * *